(12) United States Patent
Al-Nakhli (10) Patent No.: US 11,952,535 B2
(45) Date of Patent: Apr. 9, 2024

(54) THERMOCHEMICAL SOAP STICK FOR WELL LIFTING AND DELIQUIFICATION

(71) Applicant: Saudi Arabian Oil Company, Dhahran (SA)

(72) Inventor: Ayman Raja Al-Nakhli, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/297,453

(22) Filed: Apr. 7, 2023

(65) Prior Publication Data
US 2023/0303909 A1 Sep. 28, 2023

Related U.S. Application Data

(62) Division of application No. 17/705,914, filed on Mar. 28, 2022, now Pat. No. 11,732,182.

(51) Int. Cl.
*C09K 8/536* (2006.01)
*C09K 8/03* (2006.01)
*B82Y 30/00* (2011.01)

(52) U.S. Cl.
CPC ............ *C09K 8/536* (2013.01); *C09K 8/032* (2013.01); *B82Y 30/00* (2013.01); *C09K 2208/10* (2013.01)

(58) Field of Classification Search
CPC ...................................................... E21B 21/14
See application file for complete search history.

(56) References Cited

U.S. PATENT DOCUMENTS

| 3,273,643 | A | * | 9/1966 | Billings | C09K 8/94 |
| | | | | | 175/69 |
| 4,178,993 | A | * | 12/1979 | Richardson | E21B 43/121 |
| | | | | | 166/305.1 |
| 5,515,924 | A | * | 5/1996 | Osterhoudt, III | C09K 8/94 |
| | | | | | 166/309 |
| 11,441,069 | B2 | * | 9/2022 | AlYousif | C09K 8/94 |

* cited by examiner

*Primary Examiner* — William D Hutton, Jr.
*Assistant Examiner* — Avi T Skaist
(74) *Attorney, Agent, or Firm* — Fish & Richardson P.C.

(57) ABSTRACT

A thermochemical soap stick, system, and method for unloading liquid from a well, the thermochemical soap stick having thermochemical reagents and to be provided into a wellbore in a subterranean formation, the thermochemical soap stick to dissolve in the liquid giving a thermochemical reaction to generate gas to foam the liquid, and displacing the liquid from the wellbore via pressure of the subterranean formation.

19 Claims, 6 Drawing Sheets

THERMOCHEMICAL SOAP STICK FOR WELL LIFTING AND DELIQUIFICATION

CROSS-REFERENCE TO RELATED PATENT APPLICATIONS

This application is a divisional of and claims the benefit of priority to U.S. patent application Ser. No. 17/705,914, filed Mar. 28, 2022, the contents of which are incorporated by reference herein.

TECHNICAL FIELD

This disclosure relates to lifting liquid from a well to unload the liquid from the well for deliquification of the well.

BACKGROUND

A well may be unloaded by removing the column of kill fluid (e.g., water, condensate, etc.) from the wellbore to initiate flow from the subterranean formation (reservoir). The condensate liquid and water accumulating in the wellbore and nearby regions of the subterranean formation potentially reduce gas production up to 100%. Practices for unloading a well may include circulation of lower density fluid, nitrogen lifting, swabbing, plunger lift, and so on. The selection of the technique employed may depend on the well completion design, reservoir characteristics, and other factors. Several methods are employed to remove condensate damage and restore gas productivity. Gas injection and hydraulic fracturing are some of the treatments employed in mitigating condensate banking.

Hydrocarbon wells may produce unwanted water. A gas well (or oil and gas well) may produce water in conjunction with the desired hydrocarbons, such as natural gas and sometimes crude oil. In the early life stages of the well, high gas pressure and velocity may facilitate moving the unwanted water up the well. In this early life of the well, the flowing pressures (e.g., of the natural gas from the subterranean formation) may be sufficient to carry the undesired water through the wellbore to the Earth surface and out of the wellbore to be separated from the hydrocarbons (e.g., natural gas, crude oil, etc.) at the surface. Over time, as the subterranean reservoir produced begins to deplete, the pressures of the reservoir may decrease and the rate of the produced hydrocarbon flow in turn decreases. When this occurs, the flowing pressure decreases, which can have an adverse effect on the capacity of the well to carry and remove the undesired water being produced by the well. This may be especially problematic in natural gas wells.

As the well ages, reservoir pressure and velocity in the wellbore may decline, allowing water (and other liquid such as condensate) to begin accumulating at the bottom of the well. This accumulation of liquid exerts downward hydrostatic pressure on the subterranean formation gas. Eventually, the weight of the water (the hydrostatic pressure) in the wellbore may cease the gas production (e.g., natural gas) by exceeding the bottomhole pressure that is the driving force (motive force) for the gas flow upward. When the well cannot carry the liquid (e.g., water) out of the wellbore, the liquid builds up in the well or wellbore (e.g., in hydrocarbon production tubing) and restricts or shuts off flow to the surface. This may be labeled as a dead or drowned well. To keep the well functional, the liquid (e.g., water) generally must be removed to allow gas production to resume. Otherwise, the well may be considered plugged and ultimately abandoned. There are a number of ways to eliminate water (and condensate) in the well, but most techniques come with disadvantages, such as high cost or significant energy requirements. A pumping unit to remove the liquid may be expensive to install and operate (requiring electricity or gas to operate). Swabbing operations require an expensive work rig to bail out the water.

SUMMARY

An aspect relates to a method of unloading liquid from a wellbore of a well, including providing a thermochemical soap stick having thermochemical reagents into the wellbore. The wellbore is formed in a subterranean formation. The method includes allowing the thermochemical soap stick to dissolve in the liquid in the wellbore, and activating a thermochemical reaction of the thermochemical reagents from the thermochemical soap stick in the liquid to generate gas via the thermochemical reaction, thereby generating foam from the liquid and the gas. The method includes relying on a pressure of the subterranean formation to displace the liquid from the wellbore, thereby unloading the liquid from the wellbore.

Another aspect relates to a method of unloading liquid from a wellbore of a well, including providing a thermochemical soap stick having a surfactant and thermochemical reagents to the wellbore formed in a subterranean formation. The thermochemical reagents include an ammonium-containing compound and a nitrite-containing compound. The method includes allowing the thermochemical soap stick to descend in the wellbore to below a liquid level of the liquid in the wellbore, wherein the thermochemical soap stick dissolves in the liquid, and wherein the liquid includes water. The method includes activating a thermochemical reaction of the thermochemical reagents to generate nitrogen gas via the thermochemical reaction, thereby generating foam from the liquid and the nitrogen gas. The method includes flowing the liquid including the foam from the wellbore through the wellbore to Earth surface, thereby unloading the liquid from the wellbore, wherein motive force for the flowing of the liquid is a pressure of the subterranean formation.

Yet another aspect relates to a thermochemical soap stick that is a thermochemical soap material in a cylindrical shape to be provided to a wellbore in a subterranean formation and configured to dissolve in liquid (including water) in the wellbore. The thermochemical soap material includes a surfactant. The thermochemical soap material includes thermochemical reagents configured to react in a thermochemical reaction in the liquid to generate nitrogen gas to foam the liquid to give foam for unloading of the liquid from the wellbore. The thermochemical reagents include an ammonium-containing compound including ammonium hydroxide, ammonium chloride, ammonium bromide, ammonium nitrate, ammonium nitrite, ammonium sulfate, ammonium carbonate, or ammonium hydroxide, or any combinations thereof. The thermochemical reagents include a nitrite-containing compound, which may be sodium nitrite or potassium nitrite, or both.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Aspects of the present disclosure are directed to thermochemical soap solid formulations (thermochemical soap solid compositions). The thermochemical soap solid formulation can be in the shape of a stick and thus labeled as a thermochemical soap stick (e.g., generally cylindrical that is solid and not hollow). The thermochemical soap solid formulation can instead be in the shape of pellets or cubes, or other shapes. In implementations, the composition of the thermochemical soap solid can be independent of the shape and can be generally the same for the different shapes of the thermochemical soap solid. In some implementations, the thermochemical soap solid may include typical components of a soap stick but with the innovative additional inclusion of at least thermochemical reagents.

Aspects of the present disclosure are directed to artificial lift for deliquification in gas wells (or in oil and gas wells). Some aspects are directed to lift employing a solid thermochemical soap stick or the solid thermochemical soap in the shape of pellets, cubes, or other shapes (including irregular shapes). The thermochemical solid soap as provided to the well may facilitate unloading liquid from the well for kicking off (or restoring production from) the well. In implementations, such unloading can be implemented without swabbing or coiled tubing intervention to unload the well. Some embodiments can avoid expensive interventions to unload liquid from gas wells or from oil and gas wells. The present soap stick may reduce the hydrostatic head of the liquid accumulated in the well. Such may make unloading feasible for lower lift pressures (lower bottomhole pressures), and thus provide for increased length of time of producing wells, and so on. The inclusion of thermochemical reagents in the soap stick is pioneering and a surprising discovery. See FIGS. 3, 4, and 5 associated with the Example below performed in the laboratory. FIG. 5 depicts the significant amount of foam generated from a relatively small amount of water via an example of the present thermochemical soap solid formulation. Such was without imposed agitation. Instead, the generation of gas provided the agitation. Thus, the thermochemical soap stick may be labeled as a self-agitating soap stick.

Embodiments of the present techniques include the aforementioned thermochemical soap stick for liquid unloading (water and condensate) from a hydrocarbon well. The liquid unloading may be characterized as well lifting. The thermochemical soap includes thermochemical reagents that may be activated by subterranean formation heat (temperature) to react to give gas (e.g., nitrogen) to generate foam in the liquid accumulated in the well to reduce the hydrostatic pressure exerted by the liquid. An example of the thermochemical reagents is a combination of sodium nitrite and ammonium chloride, which when reacted generates nitrogen gas. The activator of the thermochemical reagents (and their thermochemical reaction) can be downhole temperature, as mentioned, and/or a chemical activator, such as acid (e.g., acetic acid, citric acid, hydrochloric acid, etc.). The thermochemical soap stick can include the chemical activator (for the thermochemical reagents), additional gas-generating components (e.g., bicarbonate to generate carbon dioxide), surfactants, foaming agents, emulsifiers, foam stabilizers, nanoparticles (for foam stabilization), and so forth. In application, the thermochemical soap stick may be dropped to inside the well and allowed to descend to below the liquid level in the wellbore. The exothermic thermochemical reaction may be activated due to downhole temperature and/or chemical activator. Thus, foam may be generated via the thermochemical reaction generating gas (e.g., nitrogen) in the well liquid as accumulated (well column liquid that is killing or partially killing the well), which may help (facilitate) to lift the liquid. The foam generation via the thermochemical stick may reduce the hydrostatic pressure exerted by the liquid. The liquid accumulated in the well (and that may be lifted to unload the well) may include water, condensate, and/or liquid hydrocarbons other than condensate. In embodiments, such liquid unloading of the well via application of the thermochemical soap stick can be implemented without utilizing expensive well-services operations, such as nitrogen kick-off, coiled tubing intervention, or artificial lifting equipment.

The thermochemical soap stick may facilitate unloading liquid from the well by generating gas (e.g., nitrogen) to form foam in situ from the liquid to decrease the hydrostatic pressure of the liquid column so that formation pressure can produce the liquid (foamed liquid) out of the well. The foam can be formed from via the thermochemical reaction generating gas (e.g., nitrogen) and with additional cause for the foam formation via surfactant and/or foaming agent in the thermochemical soap stick, and/or via bicarbonate (optionally included in the thermochemical soap stick) generating carbon dioxide gas, and so forth. The thermochemical soap stick may generate pressure to help produce the liquid. Formation pressure may be a driving force for producing (discharging) the foamed liquid column out of the wellbore to the Earth surface. The formation pressure may be adequate as motive force for displacing (unloading) the liquid after the thermochemical soap stick(s) has been applied.

Well lifting can mean unloading liquid from a well. Well lifting can mean unloading the liquid from the well and allowing hydrocarbon flow from the reservoir (subterranean formation) upward through the wellbore to Earth surface. One way the liquid (e.g., water) can be removed is by adding surfactants to the liquid in the well and relying on residual gas pressure and migration to produce agitation and foam to lift the unwanted fluids out of the well. However, the agitation (and thus the foam generation) may be inadequate to facilitate lifting of the liquid from the well. This may be especially so in cases with little or no existing gas flow or migration. Conversely, present embodiments of the thermochemical soap stick having surfactants beneficially generate gas (and heat) via the thermochemical reaction and therefore cause agitation and in situ formation of foam for the well lifting. The present thermochemical soap stick can be characterized and labeled as a self-agitating soap stick (a soap stick having components to generate gas for agitation or foam generation in the accumulated liquid).

Embodiments of the present techniques facilitate lifting of liquid (for unloading liquid) from a gas well (or gas and oil well) by utilizing a self-activated foam stick (e.g., from formation heat) that is a thermochemical soap stick. Again, the present thermochemical soap stick (or the present thermochemical soap formulation [solid] in forms other than a stick) contains thermochemical reagents (and optionally an associated chemical activator) and can include surfactants, foaming agent, emulsifier, nanoparticles, foam stabilizers, a compound (e.g., bicarbonate, such as calcium bicarbonate or sodium bicarbonate) for generating carbon dioxide ($CO_2$), and the like. These foam sticks may be dropped inside (into) a wellbore. Once these sticks reach downhole (to below the liquid level), they may dissolve due to the presence of water and high reservoir (subterranean formation) temperature. The thermochemical reagents may start to react and generate nitrogen ($N_2$) gas due to subterranean formation heat (temperature) and/or a chemical activator (e.g., acid) included in the soap stick. Such gas generation may form in-situ foam and facilitate (cause) lifting of the well (unloading liquid from the well) with the existing or current formation pressure (e.g., at bottomhole of the wellbore) as the motive force displacing the liquid to surface. Emulsifiers can be added to create three phase foam of hydrocarbons (e.g., condensate), water, and gas. Bicarbonate (e.g., calcium bicarbonate, sodium bicarbonate, etc.) can be included in the thermochemical soap stick to generate in situ $CO_2$ gas, which may also create more stabilized foam. In implementations, the present soap stick may be utilized to facilitate kicking-off or unloading the well without swabbing or coiled tubing intervention. As indicated, some embodiments can avoid expensive interventions to unload the wells. The present soap stick may facilitate lift of accumulated liquids from the wellbore to unload a liquid-loaded well so that the well may produce hydrocarbon from the reservoir (subterranean formation). After unloading, the well may then produce hydrocarbon from the subterranean formation. In the production when a column of liquid again accumulates in the wellbore, a present thermochemical soap stick(s) may be again applied. In implementations, the present thermochemical soap stick may be applied to gas and oil wells typically having high gas-liquid ratio (GLR). The application of the present soap stick can be an artificial-lift technique utilized in gas wells to unload liquid (e.g., condensate, water, etc.). However, the present soap stick may be also applied to oil and gas well with or without high GLR. The soap stick may be applied (provided) into the well via the tubing or casing of the well. As discussed, the application of the thermochemical soap stick may facilitate (promote, advance) lifting or upward displacement (out of the wellbore to the Earth surface) of the accumulated liquid in the wellbore to restore or increase production in liquid-loaded wells. As mentioned, in certain implementations with the thermochemical soap stick, swabbing or coiled-tubing intervention may be avoided in liquid unloading or kicking off the well.

In some embodiments, the wellbore may be shut-in for initially applying (e.g., dropping, injecting, etc.) of the soap stick into the wellbore. The placing of the wellbore as shut-in may involve closing a production valve at the wellhead to stop flow of fluid (if any) from the wellbore and production tubing through the production valve. The shut-in of the wellbore may increase pressure in the wellbore.

The production valve at the valve may be in an open position at commencement of the application of the thermochemical soap stick and associated unloading of the well. If not, the production valve at the wellhead may be opened to unload the wellbore and/or unload production tubing in the wellbore. The opening of the production valve may allow for the column of liquid in the wellbore to be displaced through the production valve to unload the liquid from the wellbore and production tubing if present.

The unloading of the liquid from the wellbore may involve discharging the liquid through the production valve at the wellhead. The technique may encompass unloading the liquid from the well via the lower hydrostatic pressure (less weight) of the wellbore liquid column caused by the dissolution and reactions of the thermochemical soap stick, and by then flowing the lightened liquid from the wellbore production tubing through the production valve, e.g., into a sales line.

The technique may include producing hydrocarbon from the subterranean formation through the wellbore and the production valve at the wellhead after unloading the liquid from the wellbore. The method may include producing the hydrocarbon from the subterranean formation through the production tubing and the production valve via formation pressure after the liquid column (kill liquid) is unloaded from the wellbore. The wellbore may include casing having perforations for introduction of the hydrocarbon into the wellbore from the subterranean formation. The producing of the hydrocarbon through the wellbore may involve flowing the hydrocarbon (e.g., natural gas and crude oil) through production tubing in the wellbore.

As indicated, the soap stick may typically be utilized in high GLR gas and oil wells, but is versatile to be utilized in lower GLR wells as well. The GLR is the ratio of produced gas volume to total produced liquids (oil and water) volume. As with other artificial lift techniques, the purpose of the soap stick may be to remove liquids from the wellbore so that the well can be produced at lower (e.g., the lowest) bottomhole pressure and increased (e.g., maximum) production or flow rate.

Figure 1A:
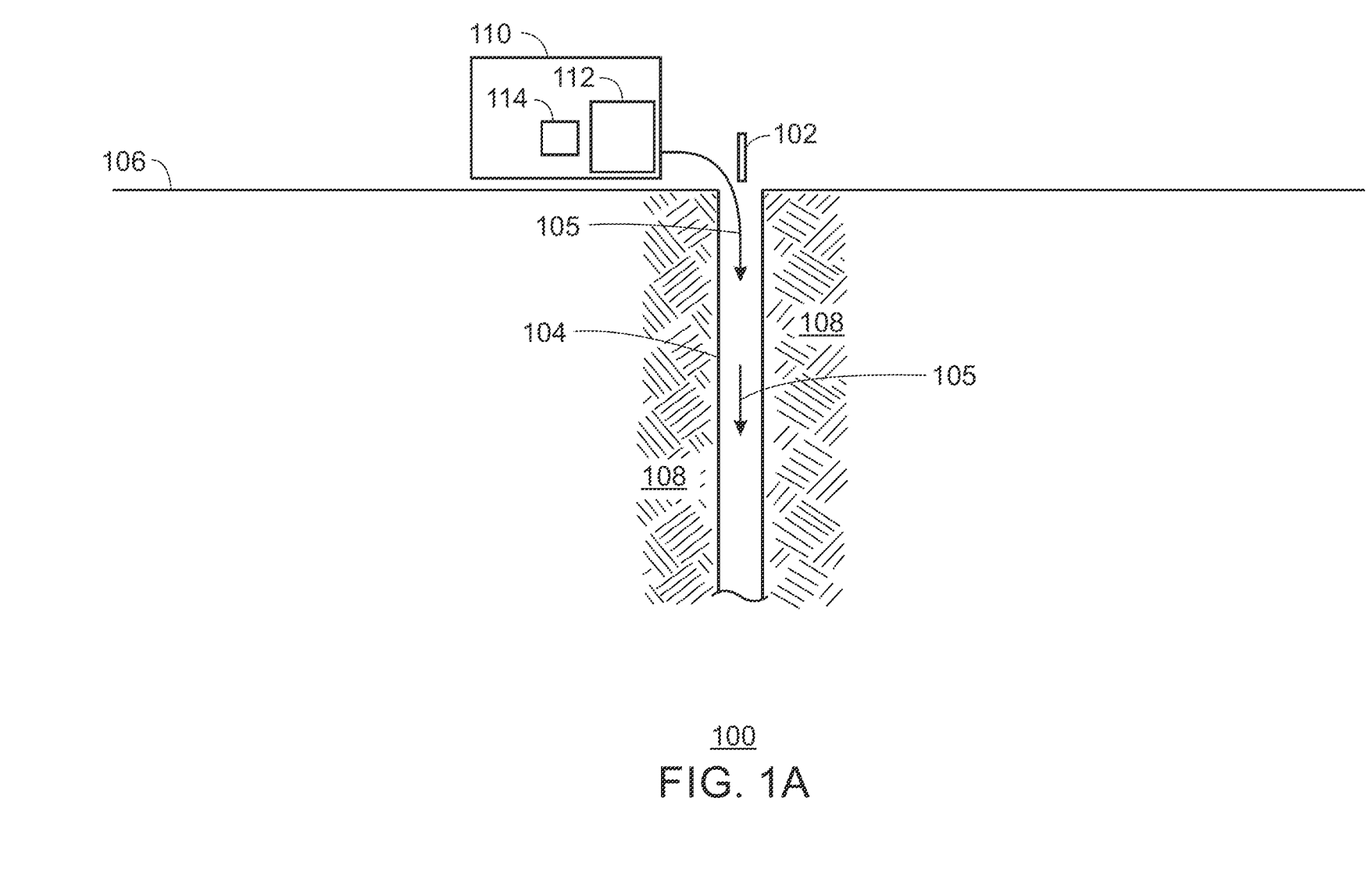
FIG. 1A is a diagram of a well in a liquid-loaded state in which natural gas production is little or none due to the hydrostatic pressure of the column of liquid.

FIG. 1A is a well 100 in a liquid-loaded state in which natural gas production is little or none due to the hydrostatic pressure of the column of liquid. A thermochemical soap stick 102 is depicted as being applied to facilitate unloading of the liquid. The thermochemical soap stick 102 may be dropped or injected into the wellbore 104 and travel downward (e.g., by gravity), as indicated by arrows 105. The soap stick 102 may descend into the liquid (not shown) in the wellbore 104. The soap stick 102 may descend to or below the liquid level (the upper surface level of liquid) in the wellbore 104. The thermochemical soap stick 102 may be generally solid, and portions or all of the soap stick 102 may dissolve in the liquid.

The number (and size) of the thermochemical soap sticks 102 provided in a given treatment (e.g., in a single day) may be in response to the amount (e.g., volume and height) of liquid (e.g., primarily water) to unload. The user or human operator may consider well conditions and other information in determining or specifying the number or amount of thermochemical soap stick(s) 102 to apply. Well conditions may include the amount and weight of the water, the pressure of the subterranean formation, well shut-in time to build the bottomhole pressure, and so forth. The thermochemical soap stick 102 may generally be cylindrical in shape as a solid cylinder. In alternate implementations, the thermochemical soap stick 102 can be the solid thermochemical soap as pellets, cubes, or other shapes.

The well 100 has a wellbore 104 formed through the Earth surface 106 into a subterranean formation 108 in the Earth crust. The subterranean formation 108 may be labeled as a geological formation, reservoir formation, reservoir, hydrocarbon reservoir, gas reservoir, oil reservoir, rock formation, hydrocarbon formation, and the like. Hydrocarbons in the subterranean formation may include natural gas, as well as crude oil. The wellbore 104 can be vertical, horizontal, or deviated. The wellbore 104 can be openhole but is generally a cased wellbore. The annulus between the casing and the formation 108 may be cemented. Perforations may be formed through the casing and cement into the formation 108. The perforations may allow for flow of fluid (e.g., produced fluid) from the subterranean formation 108 into the wellbore 102. The surface equipment 110 may include equipment (e.g., wellhead 112) to support the production of fluid from the subterranean formation 108. A wellhead may be a component or structure at the Earth surface of an oil or gas well in coupled or in communication with the wellbore 104 that provides the structural and pressure-containing interface for drilling and production equipment. The wellhead 112 generally includes conduits (piping, tubing, etc.) and valves for receiving, routing, and discharge of hydrocarbon (and water) produced from the formation 108.

The wellhead 112 may be utilized to apply (e.g., drop, insert, inject, etc.) the soap stick 102 into the wellbore 104. For example, to drop the thermochemical soap stick 102 into the wellbore 104, the soap stick 102 may be inserted into a lubricator of the wellhead 112. The lubricator is a conduit (pipe or tubing) and thus may be labeled as a lubricator pipe or lubricator tubing. In some examples, the lubricator may generally have the same inner diameter as production tubing in the wellbore 104. The lubricator as a lubricator conduit may have a hollow receptacle (e.g., to hold or receive an unloading plunger). The lubricator as a rest position of the wellhead 112 may include a catch or catcher, as appreciated by the skilled artisan. The catch may hold or retain a component received or to be applied in the lubricator and adjusted to release (drop) the component from the lubricator into the wellbore 104 (e.g., into production tubing in the wellbore 104). The lubricator with catcher may be an assembly and thus labeled as a lubricator/catcher assembly.

In some implementations, the surface equipment may include a launcher 114 (also called a stick launcher) to provide the soap stick(s) 102 for dropping or injecting the thermochemical soap stick 102 into the wellbore. In implementations, the launcher 114 may include a vessel (chamber) (e.g. metal) for receiving and housing the thermochemical soap stick 102. The launcher 114 may include a valve (e.g., ball valve) situated between the launcher vessel (container) and the wellbore 104. The valve may be situated adjacent the bottom of the launcher vessel. In examples, the launcher valve in an open position places the launcher vessel and wellbore 104 in fluid communication, so that the launcher 114 may release the thermochemical soap stick 102 into the wellbore 104. The launcher valve may be manually operated, such as by a human operator. The launcher valve may be automated and operated, for example, via a mechanical or electrical timer or other controls. In a particular implementation, the launcher 114 may insert the soap stick 102 into the lubricator.

In implementations, the wellbore 104 may be shut-in (at least temporarily) for providing the soap stick 102 to the wellbore 104. The wellbore 112 may be shut-in, for example, by closing an automated production valve (and manual valves) on the wellhead 112.

Techniques and configurations other than the aforementioned are applicable for deploying the thermochemical soap stick 102 into the wellbore 104.

As discussed, the thermochemical soap stick 102 and other shapes of the thermochemical soap solid formulations include thermochemical reagents that react in liquid, such as water. A thermochemical reaction can be a chemical reaction activated (triggered) by heat and/or that generates (releases) heat. A thermochemical or thermochemical reagent may be a chemical reactant that participates in a thermochemical reaction. For the thermochemical soap stick 102 (and the present thermochemical soap solid formulation generally), the thermochemical reagents may be solid that dissolve in the water.

The thermochemical reaction of the thermochemical reagents in the water or other liquid may be activated (triggered, promoted, advanced) by temperature, such as activated or triggered at a temperature in the range of 120° F. to 150° F., e.g., at 140° F. The thermochemical reaction of the thermochemical reagents in the soap stick 102 may be activated, for example, at a temperature (a lower temperature) in the range of 120° F. to 180° F. or in the range of 120° F. to 160° F. In implementations, the thermochemical reaction can be further advanced or promoted at temperatures greater than 160° F. or 180° F. In embodiments, the thermochemical reaction of the thermochemical reagents is not activated by heat or temperature at temperatures less than 120° F. or less than 140° F., depending on the embodiment. However, in those embodiments, the temperature of the wellbore 104 and regions of the subterranean formation 108 adjacent to the wellbore 104 (the near wellbore region) being at values greater than 120° F., 130° F., 140° F., etc. can generally activate or trigger the thermochemical reaction of the thermochemical reagents. Further, as discussed, a chemical activator (e.g., acid) can activate the thermochemical reagents and their thermochemical reaction at temperatures less than 120° F., 130° F., or 140° F., as well as activate or advance (promote) the thermochemical reaction at temperatures greater than 120° F., 130° F., or 140° F.

In embodiments, the thermochemical reagents include an ammonium-containing compound that provides ammonium ions and/or a nitrite-containing compound that provides nitrite ions. The ammonium-containing compound as a thermochemical reagent that provides ammonium ions can include, for example, ammonium hydroxide, ammonium chloride, ammonium bromide, ammonium nitrate, ammonium nitrite, ammonium sulfate, ammonium carbonate, ammonium hydroxide, and the like. In implementations, the ammonium-containing compound can more generally be compounds that can provide or generate ammonium ions. A compound (analogous to the ammonium-containing compound) that can participate in the thermochemical reaction (in lieu of or in addition to the ammonium-containing compound) to generate the nitrogen gas is urea. Urea, also known as carbamide, is an organic compound with the chemical formula $CO(NH_2)_2$. The nitrite-containing compound as a thermochemical reagent that provides nitrite ions can include, for example, sodium nitrite or potassium nitrite, or both. In implementations, the nitrite-containing compound can be more generally be compounds that can provide or generate nitrite ions. Such a compound (analogous to the nitrite-containing compound) that can participate in the thermochemical reaction (in lieu of or in addition to the nitrite-containing compound) to generate the nitrogen gas is sodium hypochlorite. The pairings of a first thermochemical reagent-second thermochemical reagent (combinations) in the thermochemical soap formulations can include urea-sodium hypochlorite, urea-sodium nitrite, ammonium hydroxide-sodium hypochlorite, ammonium chloride-sodium nitrite, and the like.

The thermochemical reaction (that occurs in the accumulated liquid in the wellbore 104 upon, during, and after the solid thermochemical stick 102 is dissolved in the liquid) is generally exothermic. As an example, the thermochemical reaction can be represented as follows for a first thermochemical reagent-second thermochemical reagent pair as ammonium chloride ($NH_4Cl$)-sodium nitrite ($NaNO_2$):

$$NH4Cl + NaNO2 \xrightarrow{(H+ \text{ or } \Delta H)} N2\,(g) + NaCl + 2H2O + \text{Heat (75 Kcal/mol)}$$

In the thermochemical reaction (an exothermic reaction) depicted immediately above, sodium chloride (NaCl), water ($H_2O$), and heat are generated in addition to the generated $N_2$. The heat generated may be, for example, 75 kilocalories per mol (Kcal/mol). The thermochemical reaction can be activated by heat ($\Delta H$) and/or a hydrogen ion (H+) such as from an acid. While the thermochemical reaction may experience an enthalpy change, the symbol $\Delta H$ here represents the addition of heat, such as at temperatures greater than 120° F. The chemical activator may be a compound (e.g., acid) capable of releasing an acidic hydrogen.

Acids that can be included in the thermochemical soap formulation (thermochemical soap stick 102) as an activator (chemical activator) of the thermochemical reaction of the thermochemical reagents include weak acids (e.g., acetic acid, citric acid, etc.) and strong acids (hydrochloric acid, etc.). The strong acids can be concentrated or diluted in the solid formulation. In general, a compound capable of releasing an acidic hydrogen can be utilized as the chemical activator in implementations. Moreover, reservoir temperature (temperature of the subterranean formation) may be adequate to activate the thermochemical reaction without a chemical activator. Further, nitrite-containing compounds can be employed as a stand-alone thermochemical reagent (reactant) in the thermochemical soap stick 102 without ammonium ions or acid to generate $N_2$ gas.

The thermochemical soap stick 102 (or thermochemical soap solid formulation more generally) may include a foaming compound that can be a foaming agent (foamer) and/or foam stabilizer. A foaming agent may be called foamer. The foaming agent may broadly include the foam stabilizer. A foaming compound or foaming agent is a material (e.g., surfactant) that facilitates the formation of foam. When present (e.g., in relatively small amounts) the foaming compound or foaming agent may reduce surface tension of a liquid (reduces the work needed to create the foam) and/or be a foam stabilizer that may increase the foam colloidal stability by inhibiting coalescence of bubbles. The foaming agent or foaming stabilizer may be a surfactant, such as a betaine (for example, hydroxysulfobetaine) or a hydroxysultaine (for example, cocamidopropyl hydroxysultaine). Other examples of the foaming agent or foaming stabilizer include alpha olefin sulfonate, alkyl aryl sulfate, carboxylated ethoxylated fatty alcohol (as a sodium salt), and ethoxylated linear alcohol. In certain contexts, distinctions may be made between foaming agent versus foam stabilizer in that a foaming agent (foamer) may be characterized as compounds that facilitate or promote generation of foam and a foam stabilizer may be characterized as compounds that facilitate or promote stability (not collapsing) of the foam after generation of the foam. In these contexts, foaming agents can be, for example, surfactants and fatty acid, and foam stabilizer can be organic or inorganic compounds, and nanomaterials. However, in other instances, the foaming agent may be characterized as generally synonymous with foam stabilizer. A foaming compound may be a foaming agent and/or a foam stabilizer.

In some implementations, nanoparticles (e.g., silica nanoparticles) may be included in the thermochemical soap stick 102 to stabilize the in-situ generated foam and thus act as a foam stabilizer.

Surfactants in addition to any surfactants of foaming agents or foam stabilizers may be incorporated in the thermochemical soap stick 102, for example, to reduce friction experienced in the flow of the liquid during unloading. Examples of surfactants to reduce friction include polyacrylic acid, polyacrylamide, hydrolyzed polyacrylamide, and acrylamidomethyl propane sulfonate.

Gas-generating compounds or components (e.g., bicarbonate to generate carbon dioxide) in addition to the thermochemical reagents may be included in the thermochemical soap stick 102. The generated gas, e.g., carbon dioxide ($CO_2$), may promote formation and stability of the in-situ generated foam in the liquid to be lifted (unloaded). In some implementations, the gas-generating component is bicarbonate, such as calcium carbonate or sodium carbonate, or both. As the thermochemical soap stick 102 dissolves, the bicarbonate may decompose in response to heat or react with acid (e.g., a weak acid such as acetic acid) to give carbon dioxide gas.

In some implementations, the thermochemical soap stick 102 may include an emulsifier. An emulsifier (emulsifying agent) may be a chemical additive that creates and emulsion (a dispersion of one immiscible liquid into another) by reducing the interfacial tension between the two liquids to achieve stability. An emulsion may be a liquid/liquid dispersion that does not readily separate. In implementations, the emulsifier may be polar molecules. The emulsifier may be, for example, lecithin, gum arabic, octenyl succinate starches, paraffins, resins, organic acids, metallic salts, asphaltenes, alkylphenol ethoxylates, surfactants (e.g., an ether of carboxylic acid), or fatty acid amide derivatives, or any combinations thereof.

Figure 1B:
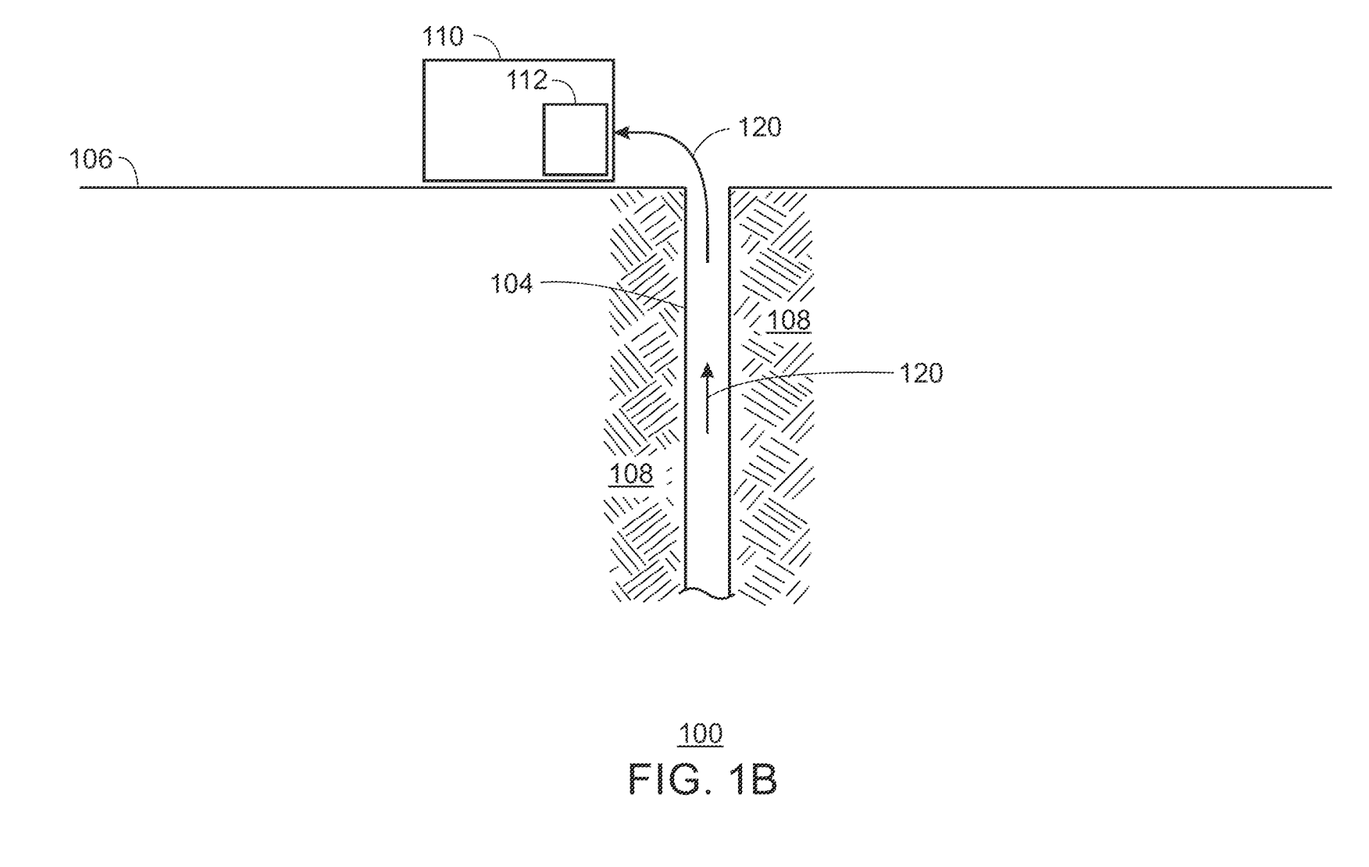
FIG. 1B is a diagram of the well of FIG. 1A being unloaded after application of the thermochemical soap stick of FIG. 1A.

FIG. 1B is the well 100 being unloaded after application of the thermochemical soap stick 102 as depicted in FIG. 1A. The liquid 120 (the column of liquid that stopped production) is lifted (flows) out of the wellbore 108 to the Earth surface 106. The application of the thermochemical soap stick 102 generated foam to decrease the hydrostatic pressure of the liquid 120 such that formation 108 pressure is adequate to produce to liquid 120. Because of the lower hydrostatic pressure, the formation 108 pressure provides an adequate motive force for flow of the liquid 120 upward out of the wellbore 104. As discussed, the surface equipment 110 may include equipment (e.g., wellhead 112) to support the production of fluid from the wellbore 104 and subterranean formation 108. The wellhead 112 generally includes conduits (piping, tubing, etc.) and valves for receiving, routing, and discharge of the liquid 120.

Subsequent to removing the liquid 120 (unloading the liquid 120) from the wellbore 104, the well 100 may be beneficially placed into hydrocarbon production in which hydrocarbon (e.g., natural gas, or natural gas and crude oil) is produced from the subterranean formation 108. In this hydrocarbon production phase, the reference numeral 120 may be indicative of the desired hydrocarbon along with any undesired water from the formation 108. Condensate (natural-gas condensates that are hydrocarbons) may also be produced. Condensates may be the liquid form of these hydrocarbons that take their name from the process of removing them from the gas stream by processing with specific temperature and pressure. In instances, the terms natural gas liquids (NGL) and condensate can generally be used interchangeably. NGLs and condensates may both be a mixed stream of hydrocarbons representing light hydrocarbons, such as ethane, and heavier hydrocarbons, such as pentane.

As mentioned, the wellbore 104 can be openhole but is generally a cased wellbore. For a cased wellbore 104, the natural gas and any crude oil, unwanted water, and/or condensate may flow from the subterranean formation 108 through the perforations (not shown) (in the cemented casing) into the wellbore 104. Again, the surface equipment 110 may include equipment to support the production of fluid from the subterranean formation 108. During the desired hydrocarbon production, the wellhead 112 may include a production valve (e.g., sales valve) for the flow (discharge) of produced hydrocarbon, such as natural gas (and crude oil). The hydrocarbon may flow from the production tubing (not shown) in the wellbore 104 through the wellhead 112 (flow through the production valve into a discharge conduit, e.g., sales line). In embodiments, the production valve may be a motor operated valve (MOV).

As discussed, the thermochemical soap stick 102 (generally a solid) may be a cylindrical shape, and includes a thermochemical reagent(s), such as an ammonium-containing compound or a nitrite-containing compound, or both. In application, a thermochemical reaction of the thermochemical reagents generates gas, such as $N_2$, that foams the liquid (e.g., water) in the wellbore 102 prior to unloading the well. The thermochemical reaction may be activated by heat from the subterranean formation 108, such as at a temperature (subterranean formation temperature) in a range of 140° F. to 180° F., or greater. The thermochemical soap stick 102 may include acid to activate the thermochemical reaction. The thermochemical soap stick 102 may include a foaming compound (foaming agent and/or foam stabilizer) to advance the foam. The foaming compound may promote formation of the foam or promote stability of the foam, or both. In implementations, the foaming compound may include a surfactant. The thermochemical stick 102 may include nanoparticles that act to stabilize the foam.

The thermochemical reagents 102 may be in the range of 1 molar to 6 molar of the thermochemical soap stick 102. The foaming agent (if included) may be in the range of 1 volume percent (vol %) to 10 vol % of the thermochemical soap stick 102. The foam stabilizer (if included) may be in the range of 0.1 weight percent (wt %) to 5 wt % of the thermochemical soap stick 102. The nanoparticles (if included) may be in the thermochemical soap stick 102 in the range of 0.1 wt % to 5 wt %. The emulsifier (if included) may be in the thermochemical soap stick 102 in the range of 1 vol % to 10 vol %. The calcium carbonate (if included) may be in the thermochemical soap stick 102 in the range of 0.1 vol % to 10 wt %. The acid (if included) as an activator may be in the thermochemical soap stick 102 in the range of 0.1 wt % to 30 wt %. The surfactant (if included) for reducing friction may be in the thermochemical soap stick 102 in the range of 0.1 wt % to 10 wt %]. These numerical ranges are only examples and not intended to limit the present techniques.

Figure 2:
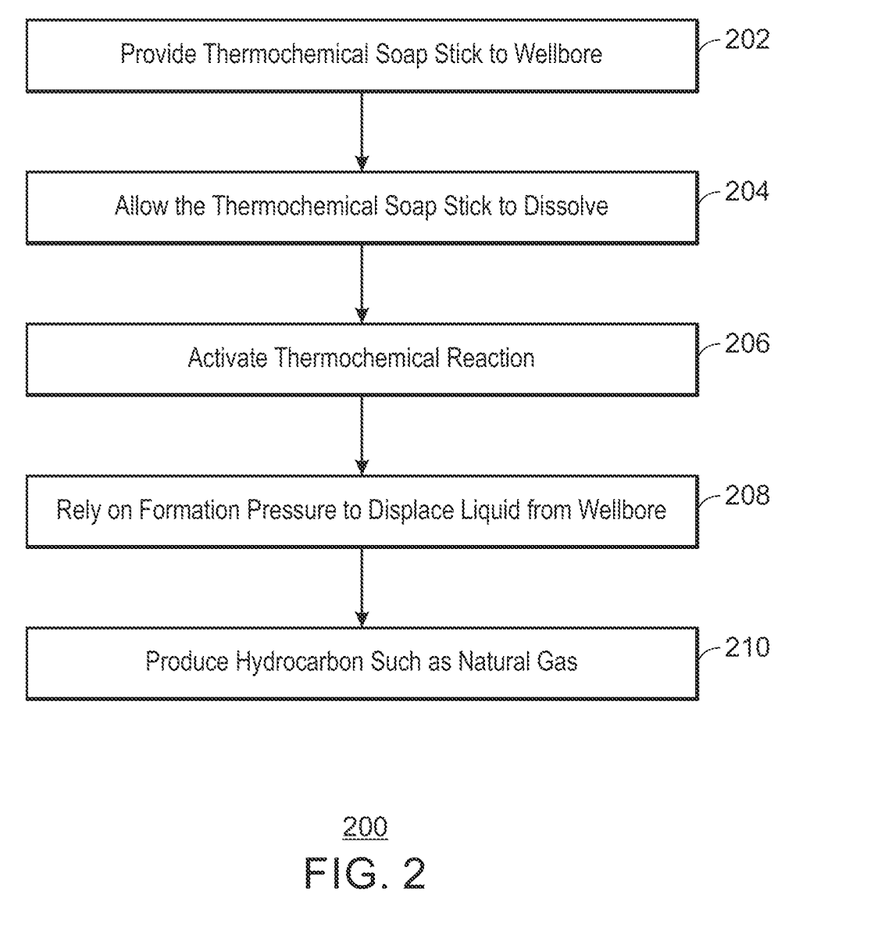
FIG. 2 is a block flow diagram of a method 200 of unloading liquid (e.g., including water) from a wellbore of a well.

FIG. 2 is a method 200 of unloading liquid (e.g., including water) from a wellbore of a well. The wellbore is formed in a subterranean formation.

At block 202, the method includes providing a thermochemical soap stick having a surfactant and thermochemical reagents into the wellbore. As discussed, the thermochemical reagents may include an ammonium-containing compound and a nitrite-containing compound. The thermochemical soap stick descends in the wellbore to at or below a liquid level of the liquid in the wellbore. The thermochemical soap stick is configured to dissolve in the liquid.

At block 204, the method includes allowing the thermochemical soap stick to dissolve in the liquid in the wellbore. The dissolution may free components of the thermochemical soap stick to interact with each other or with the liquid, and the like.

At block 206, the method includes activating a thermochemical reaction of the thermochemical reagents from the thermochemical soap stick in the liquid to generate gas (e.g., nitrogen gas) via the thermochemical reaction, thereby generating foam from the liquid and the gas. The activating may involve activating the thermochemical reaction with heat from the subterranean formation or with an acid if included in the thermochemical soap stick, or both. The generating of the foam may reduce hydrostatic pressure of the liquid in the wellbore. The generating of the foam may facilitate the unloading (see block 208) of the liquid from the wellbore.

At block 208, the method includes relying on a pressure of the subterranean formation to displace the liquid from the wellbore, thereby unloading the liquid from the wellbore. The generating (block 206) of the foam may facilitate to displace the liquid. To displace the liquid may involve flowing the liquid through the wellbore to Earth surface. In other words, the method may include flowing the liquid including the foam from the wellbore through the wellbore to the Earth surface, thereby unloading the liquid from the wellbore. The motive force for the flowing of the liquid is the pressure of the subterranean formation.

This pressure of the subterranean formation may be the bottomhole pressure of the wellbore. The bottomhole pressure may be the subterranean formation (reservoir) pressure at the bottom or bottom portion of the wellbore. The bottomhole pressure may be the downhole pressure measured or calculated at a point of interest, generally the top of the wellbore perforated interval.

The hydrostatic pressure of the liquid in the wellbore prior to providing (block 202) the thermochemical soap stick into the wellbore may be greater than the pressure of the subterranean formation. In implementations, prior to providing (block 202) the thermochemical soap stick to the wellbore, the well is not producing hydrocarbon (e.g., natural gas) because hydrostatic pressure of the liquid in the wellbore is greater than the pressure of the subterranean formation, thereby preventing production of the hydrocarbon from the subterranean formation. After providing (block 202) the thermochemical soap stick, the hydrostatic pressure of the liquid in the wellbore may decrease due the in-situ generation (blocks 204 and 206) of the foam. The hydrostatic pressure may then be less than the pressure of the subterranean formation.

At block 210, the method includes producing hydrocarbon (e.g., natural gas) from the subterranean formation via the wellbore and the pressure of the subterranean formation after the unloading of the liquid from the wellbore. The formation pressure is adequate to produce the hydrocarbon.

An embodiment is a thermochemical soap stick that is a thermochemical soap material in a cylindrical shape to be provided to a wellbore in a subterranean formation and configured to dissolve in liquid including water in the wellbore. The thermochemical soap material may be solid material. The thermochemical soap material is solid or primarily solid. The thermochemical soap material includes a surfactant. The thermochemical soap material includes thermochemical reagents configured to react in a thermochemical reaction in the liquid to generate nitrogen gas to foam the liquid to give foam for unloading of the liquid from the wellbore. In implementations, the thermochemical reaction is activated at a temperature in a range of 120° F. to 200° F. The thermochemical soap material may include an acid to activate the thermochemical reaction. The thermochemical reagents include an ammonium-containing compound including ammonium hydroxide, ammonium chloride, ammonium bromide, ammonium nitrate, ammonium nitrite, ammonium sulfate, ammonium carbonate, or ammonium hydroxide, or any combinations thereof. The thermochemical reagents include a nitrite-containing compound including sodium nitrite or potassium nitrite, or both, or a compound (e.g., sodium hypochlorite) that can generate nitrite-containing compound. In implementations, the ammonium-containing compound includes ammonium chloride, and the nitrite-containing compound includes sodium nitrite. The thermochemical soap material may include a foaming compound including the aforementioned surfactant to promote formation of the foam or to promote stability of the foam, or a combination thereof. The thermochemical soap may include bicarbonate to generate carbon dioxide in response to heat from the subterranean formation. The thermochemical soap material may include nanoparticles (e.g., silica nanoparticles) to promote stability of the foam, wherein the nanoparticles have a diameter less than 100 nanometers.

In conclusion, well productivity in gas condensate reservoirs usually is reduced due to condensate and water blockage. Natural gas (and crude oil) production can diminish from gas (and) oil producers after workover of a well and thus require lifting of the well to give desired production. Embodiments of techniques in the present disclosure unload a well and enhance gas or oil production by the application of thermochemical soap sticks. The thermochemical soap stick may be formed as a generally homogenous soap stick that generates foam. The thermochemical soap stick may include thermochemical reagents, foaming agents, surfactants, nanomaterial, bicarbonate (e.g., calcium bicarbonate), acids, and emulsifiers. Embodiments utilizing the thermochemical soap stick may facilitate unloading a hydrocarbon well so to resume hydrocarbon production. When the thermochemical soap stick is dropped into a well, thermochemical reagents may be released and activated, in which foam will thus be generated downhole and unload the well.

Example

Figure 3:
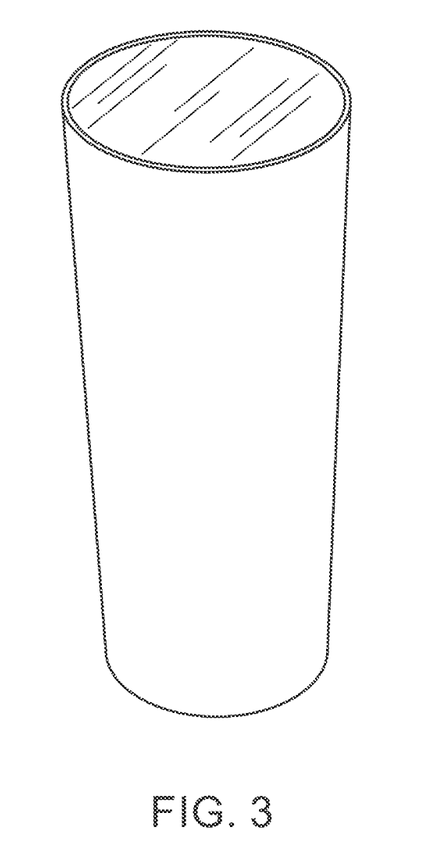
FIG. 3 is a diagrammatical representation of a thermochemical soap stick prepared in the laboratory in the Example.

FIG. 3 is a thermochemical soap stick prepared in the laboratory by incorporating thermochemical reagents as additives in an acquired pre-made soap stick. The soap stick was built again to give the soap stick as a thermochemical soap stick. The thermochemical soap stick may be utilized for well lifting. The depicted thermochemical soap stick includes sodium nitrite, ammonium chloride, foaming agent, fatty alcohol, fatty acids, foam stabilizers, emulsifiers, and acids. The thermochemical soap stick depicted in FIG. 3 is prior to application to a well and thus may be characterized as pre-activated.

The thermochemical soap stick can be dropped inside a hydrocarbon well, and dissolved in accumulated water in the wellbore. The downhole temperature may accelerate the dissolution of the foam stick and activation of thermochemical reagents. Upon the activation of thermochemical reagents, foam is generated in-situ, which may lift the well including unloading water and condensate.

Figure 4:
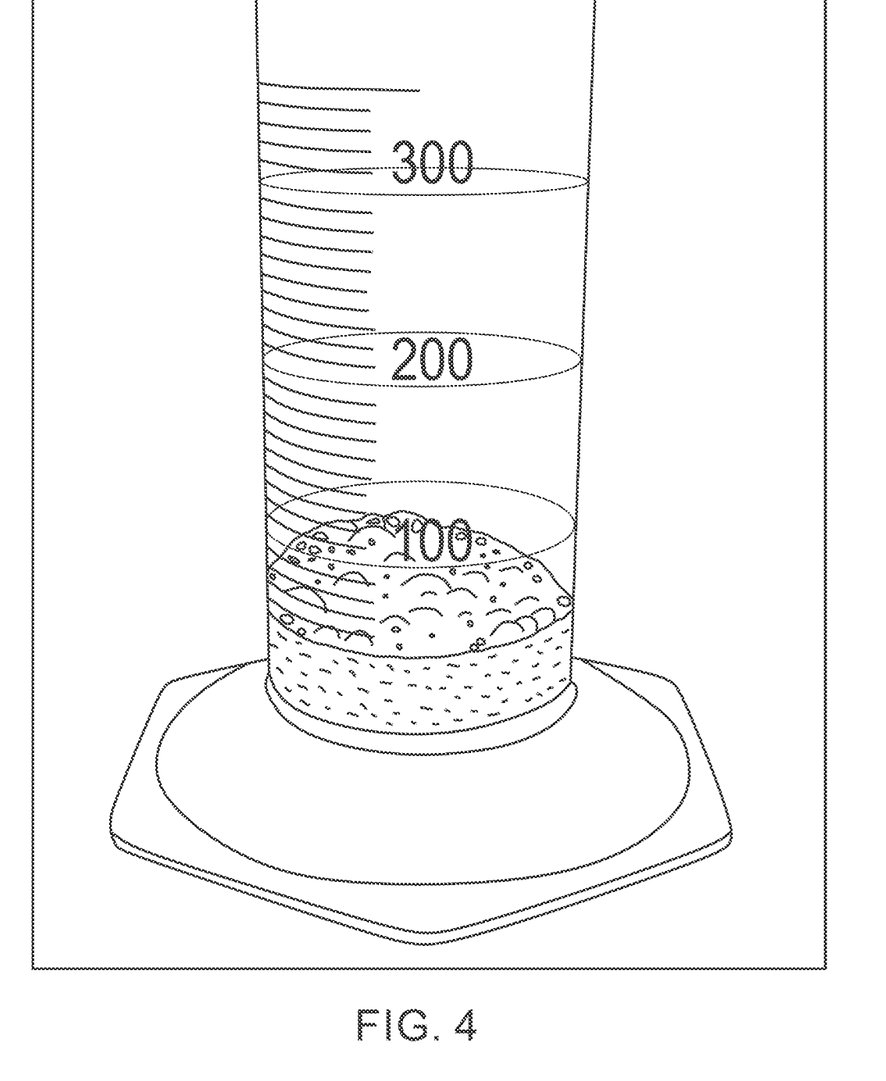
FIG. 4 is a diagrammatical representation of the thermochemical soap stick (FIG. 3) as dissolved in a graduated cylinder (beaker) in water at room temperature and before activation of the thermochemical reaction.
Figure 5:
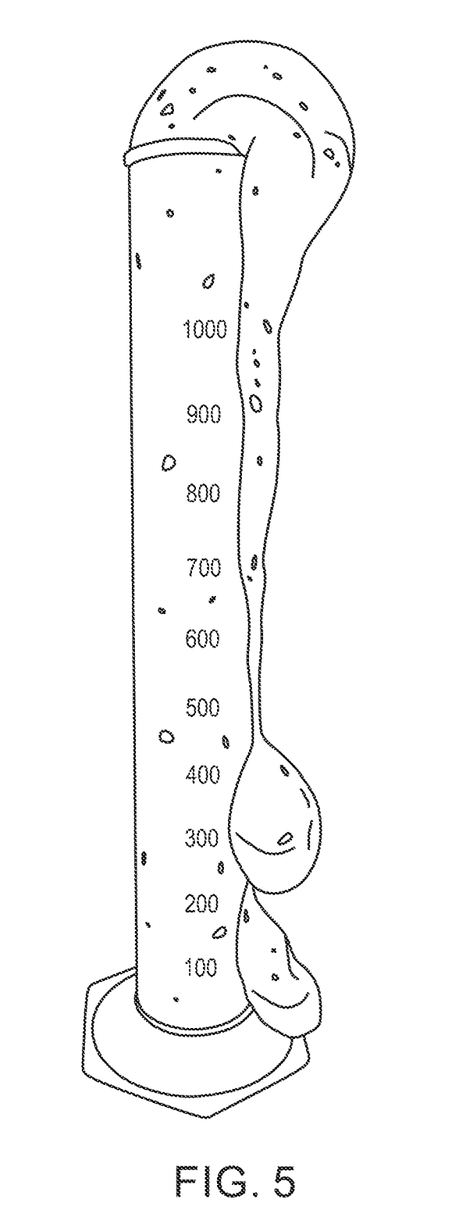
FIG. 5 is a diagrammatical representation of the dissolved thermochemical soap stick (FIG. 4) as activated in the graduated cylinder (beaker).

FIG. 4 depicts the thermochemical soap stick (from FIG. 3) as dissolved in water at room temperature and before activation of the thermochemical reaction. FIG. 5 depicts the dissolved thermochemical soap stick (from FIG. 4) as activated by acetic acid. No agitation was performed except for via the gas generation by the dissolved and activated thermochemical soap stick. As can be seen, a relatively large amount of foam is generated from a relatively small amount of water.

In this Example, the thermochemical soap stick is designed (configured) to have the thermochemical reaction of the thermochemical reagents activated by in-situ reservoir temperature at and above 140° F. In application, the thermochemical soap stick is dropped into the wellbore and dissolves in the water section. The thermochemical reaction takes place due to formation temperatures at or above 140° F., and foam is generated. The generated foam and pressure can help to lift a dead well.

A number of implementations have been described. Nevertheless, it will be understood that various modifications may be made without departing from the spirit and scope of the disclosure.

What is claimed is:

1. A thermochemical soap stick comprising:
a thermochemical soap material in a cylindrical shape to be provided to a wellbore in a subterranean formation and configured to dissolve in liquid comprising water in the wellbore, the thermochemical soap material comprising:
thermochemical reagents configured to react in a thermochemical reaction in the liquid to generate nitrogen gas to foam the liquid to give the foam for unloading of the liquid from the wellbore, the thermochemical reagents comprising:
an ammonium-containing compound comprising ammonium hydroxide, ammonium chloride, ammonium bromide, ammonium nitrate, ammonium nitrite, ammonium sulfate, ammonium carbonate, or ammonium hydroxide, or any combinations thereof; and
a nitrite-containing compound comprises sodium nitrite or potassium nitrite, or both;
a foaming compound comprising a surfactant to promote formation of the foam or to promote stability of the foam, or a combination thereof;
a friction-reducing surfactant to reduce friction experienced in unloading the liquid from the wellbore, the friction-reducing surfactant comprising polyacrylic acid, polyacrylamide, hydrolyzed polyacrylamide, or acrylamidomethyl propane sulfonate, or any combinations thereof; and
nanoparticles to promote stability of the foam, wherein the nanoparticles comprise a diameter less than 100 nanometers.

2. The thermochemical soap stick of claim 1, wherein the thermochemical soap material comprises solid material, and wherein the thermochemical reaction is activated at a temperature in a range of 120° F. to 200° F.

3. The thermochemical soap stick of claim 1, wherein the thermochemical soap material comprises an acid to activate the thermochemical reaction, the acid comprising comprises acetic acid or citric acid, or both.

4. The thermochemical soap stick of claim 1, wherein the ammonium-containing compound comprises ammonium chloride, and wherein nitrite-containing compound comprises sodium nitrite.

5. The thermochemical soap stick of claim 1, wherein the thermochemical soap material comprises bicarbonate to generate carbon dioxide in response to heat from the subterranean formation.

6. The thermochemical soap stick of claim 5, wherein the bicarbonate comprises calcium bicarbonate or sodium bicarbonate, or both.

7. The thermochemical soap stick of claim 1, wherein the thermochemical soap material is solid or primarily solid, and wherein the nanoparticles comprise silica nanoparticles.

8. The thermochemical soap stick of claim 1, wherein the thermochemical soap material comprises an emulsifier to form the foam as three-phase foam of hydrocarbon, water, and gas comprising the nitrogen gas.

9. The thermochemical soap stick of claim 8, wherein the emulsifier comprises lecithin, gum arabic, octenyl succinate starch, paraffin, resin, asphaltene, alkylphenol ethoxylate, or a surfactant that is an ether of carboxylic acid, or any combinations thereof.

10. A thermochemical soap stick comprising:
a thermochemical soap material in a cylindrical shape to be provided to a wellbore in a subterranean formation and configured to dissolve in liquid comprising water in the wellbore, the thermochemical soap material comprising:
thermochemical reagents configured to react in a thermochemical reaction in the liquid to generate nitrogen gas to foam the liquid to give foam for unloading of the liquid from the wellbore, the thermochemical reagents comprising:
an ammonium-containing compound comprising ammonium hydroxide, ammonium chloride, ammonium bromide, ammonium nitrate, ammonium nitrite, ammonium sulfate, ammonium carbonate, or ammonium hydroxide, or any combinations thereof; and
a nitrite-containing compound comprises sodium nitrite or potassium nitrite, or both;
a carbon dioxide ($CO_2$)-generating compound to generate $CO_2$ in response to heat of the subterranean formation to promote formation and stability of the foam with $CO_2$ generated by the $CO_2$-generating compound; and
silica nanoparticles to stabilize the foam, the silica nanoparticles comprising a diameter less than 100 nanometers.

11. The thermochemical soap stick of claim 10, wherein the $CO_2$-generating compound comprises a bicarbonate.

12. The thermochemical soap stick of claim 10, wherein the thermochemical soap material comprises a friction-reducing surfactant to reduce friction experienced in unloading the liquid from the wellbore, the friction-reducing surfactant comprising polyacrylic acid, polyacrylamide, hydrolyzed polyacrylamide, or acrylamidomethyl propane sulfonate, or any combinations thereof.

13. The thermochemical soap stick of claim 10, wherein thermochemical soap material comprises acetic acid or citric acid, or both, to activate the thermochemical reaction.

14. The thermochemical soap stick of claim 10, wherein the thermochemical soap material is solid in the cylindrical shape configured to dissolve in the liquid.

15. The thermochemical soap stick of claim 10, wherein the thermochemical soap material comprises an emulsifier to form the foam as three-phase foam of hydrocarbon, water, and gas comprising the nitrogen gas and the $CO_2$.

16. A thermochemical soap stick comprising:
a thermochemical soap material that is solid in a cylindrical shape to be provided to a wellbore in a subterranean formation and configured to dissolve in liquid comprising water in the wellbore, the thermochemical soap material comprising:
thermochemical reagents configured to react in a thermochemical reaction in the liquid to generate nitrogen gas to foam the liquid to give foam for unloading of the liquid from the wellbore, the thermochemical reagents comprising:
an ammonium-containing compound comprising ammonium hydroxide, ammonium chloride, ammonium bromide, ammonium nitrate, ammonium nitrite, ammonium sulfate, ammonium carbonate, or ammonium hydroxide, or any combinations thereof; and
a nitrite-containing compound comprises sodium nitrite or potassium nitrite, or both;
silica nanoparticles to stabilize the foam, the silica nanoparticles comprising a diameter less than 100 nanometers; and
a friction-reducing surfactant to reduce friction experienced in unloading the liquid from the wellbore, the friction-reducing surfactant comprising polyacrylic acid, polyacrylamide, hydrolyzed polyacrylamide, or acrylamidomethyl propane sulfonate, or any combinations thereof.

17. The thermochemical soap stick of claim 16, wherein the thermochemical soap material comprises bicarbonate to generate carbon dioxide in response to heat from the subterranean formation to promote formation and stability of the foam.

18. The thermochemical soap stick of claim 16, wherein the thermochemical soap material comprises thermochemical soap material comprises acetic acid or citric acid, or both, to activate the thermochemical reaction.

19. The thermochemical soap stick of claim 16, wherein the thermochemical soap material comprises an emulsifier to form the foam as three-phase foam of hydrocarbon, water, and gas comprising the nitrogen gas, and wherein the emulsifier comprises lecithin, gum arabic, octenyl succinate starch, paraffin, resin, asphaltene, alkylphenol ethoxylate, or a surfactant that is an ether of carboxylic acid, or any combinations thereof.

* * * * *